United States Patent [19]

Fouche et al.

[11] Patent Number: 5,313,169
[45] Date of Patent: May 17, 1994

[54] METHOD OF REALIGNING THE LOCAL OSCILLATORS OF A RECEIVER AND DEVICE FOR IMPLEMENTING THE METHOD

[75] Inventors: Yvon Fouche, Chatenay Malabry; Jean-Bernard Rault, Acigne; Tristan de Couasnon, Rennes; Raoul Monnier, Noyal S/Vilaine, all of France

[73] Assignee: Thomson-CSF, Puteaux, France

[21] Appl. No.: 890,605

[22] PCT Filed: Nov. 29, 1991

[86] PCT No.: PCT/FR91/00951
§ 371 Date: Jul. 13, 1992
§ 102(e) Date: Jul. 13, 1992

[87] PCT Pub. No.: WO92/10043
PCT Pub. Date: Jun. 11, 1992

[30] Foreign Application Priority Data

Nov. 30, 1990 [FR] France ................... 90 15015

[51] Int. Cl.[5] .............................................. H03D 3/00
[52] U.S. Cl. ................................... 329/302; 375/88; 375/120
[58] Field of Search ............... 331/2, 31, 46; 329/302; 375/88, 97, 120; 358/160

[56] References Cited

U.S. PATENT DOCUMENTS 4,518,922  5/1985  Luecke ................... 329/302

FOREIGN PATENT DOCUMENTS 0365431  4/1990  European Pat. Off. .
2145906  4/1985  United Kingdom .

OTHER PUBLICATIONS

IEEE Global Telecommunications Conference vol. 3, Nov. 1984, Atlanta, pp. 1553–1557, "A Highly Efficient HF Modem with Adaptive Fading Control Algorithm", Hirosaki, B. et al.

Primary Examiner—David Mis
Attorney, Agent, or Firm—Roland Plottel

[57] ABSTRACT

The present invention relates to a method of realigning the local oscillators of a receiver, as well as a device for implementing the method. In a receiver with a high frequency/intermediate frequency translation oscillator, an intermediate frequency/baseband translation oscillator, and a sampling oscillator receiving a signal modulated by at least one circuit for inverse fast Fourier transform $FFT^{-1}$ computation according to a multicarrier modulation of OFDM (Orthogonal Frequency Division Multiplexing) type with addition of a transition interval at the start of each transmission interval. The spectrum of the signal has two master lines with a fixed frequency difference between them. The method is characterized by the following steps: (1) determination of the start of a transmission interval; (2) determination of the position of the two master lines; and (3) computation of the variation of the phases of these two lines as a function of time, and exploitation of the result to set the frequency of the sampling oscillator and of the intermediate frequency baseband translation oscillator. The invention will find particular application to digital television.

8 Claims, 3 Drawing Sheets

METHOD OF REALIGNING THE LOCAL OSCILLATORS OF A RECEIVER AND DEVICE FOR IMPLEMENTING THE METHOD

BACKGROUND OF THE INVENTION

1. Field of the Invention.

The present invention relates to the realigning of the local oscillators of a receiver making it possible to receive a signal modulated by at least one circuit for inverse fast Fourier Transform computation according to a multicarrier modulation of OFDM (Orthogonal Frequency Division Multiplexing) type.

2. Description of the Related Art

In the International Patent Application PCT/FR 89/00546 filed in the name of THOMSON-CSF, there is described a method for transmitting modulated waves using a plurality of frequencies simultaneously, comprising successive steps of transmission of symbols for a duration $T+\Delta T$, two transmission frequencies being $1/T$ apart, T being the useful transmission interval and $\Delta T$ being the transition interval. In the above patent application, there is also described a transmitter and a receiver enabling this method to be implemented by using, in the transmitter, a circuit for inverse fast Fourier transform (FFT$^{-1}$) computation in order to carry out the modulation of the signal and, in the receiver, a circuit for fast Fourier Transform (FFT) computation in order to carry out the demodulation of the signal received. Furthermore, to enable the receiver to be synchronised with the transmitter, the spectrum of the modulated signal comprises two master lines having a fixed frequency difference between them. By using these two master lines, it is possible to slave the local oscillators as well as the sampling clock of the receiver. In the patent application mentioned above, there is therefore described a device for analog feedback control using the two master lines to control certain local oscillators of the receiver as well as the clock giving the sampling frequency.

As shown in FIG. 1, the feedback control device making it possible to realign the local oscillators of the receiver described in the above-mentioned patent application, comprises essentially a band-pass filter 2, a band-pass filter 3, a mixer 4 and a phase-lock loop (PLL) 1 generating a reference frequency for three other PLLS. The two filters 2 and 3 are connected in parallel and receive, among other things, at input two frequencies $f_A$, $f_B$, arising from the circuit for translating Intermediate Frequency into Baseband, as is explained in the above application. The outputs from the two band-pass filters 2 and 3 are sent to the mixer 4. The output from the mixer 4 is input to the phase-lock loop 1. This phase-lock loop comprises a mixer 5 whose output is connected to the input of a low-pass filter 6. The output of the low-pass filter 6 is connected to a voltage-controlled oscillator (VCO) 7. The output of the oscillator 7 is connected to the input of the phase-lock loop, namely on the other input of the mixer 5. The output from the phase-lock loop 1 is also input to three phase-lock loops 8, 9, 10. These phase-lock loops are frequency-division phase-lock loops. The phase-lock loops 8, 9, 10 constitute the outputs of the feedback control device and deliver frequency references to the various local oscillators, namely the local oscillator of the high frequency/intermediate frequency $f'_{HF}$ translation circuit, the sampling clock $f_e$, local oscillator of the Intermediate Frequency to baseband $f'_i$ translation circuit.

The circuit described above operates as follows. The filter 2 selects the frequency $f_A$ namely the frequency of one of the two master lines transmitted by the transmitter. The filter 3 selects the frequency $f_B$ namely the frequency of the other master line. The mixer 4 performs the beating between the frequencies $f_A$ and $f_B$. The phase-lock loop 1 delivers the value of the differences between frequencies $f_A$ and $f_B$. The difference between the frequencies $f_A$ and $f_B$ on transmission, determined by the transmission standard, is known. Comparison on reception enables a frequency reference and phase reference to be delivered. The phase-lock loops 8, 9 and 10 therefore deliver frequency and phase references to the various local oscillators and to the sampling clock which are used in the receiver.

SUMMARY OF THE INVENTION

The object of the present invention is to propose a new method of realigning the local oscillators of the receiver allowing entirely digital operation, as well as a device for implementing the method.

This new method and new device make it possible to lower the complexity of the clock recovery system at the level of the receiver, thus decreasing its cost.

The subject of the present invention is a method of realigning the oscillators of a receiver comprising a high frequency/intermediate frequency translation oscillator, an intermediate frequency/baseband translation oscillator, and a sampling oscillator receiving a signal modulated by at least one circuit for inverse fast Fourier transform (FFT$^{-1}$) computation according to a multicarrier modulation of OFDM (Orthogonal Frequency Division Multiplexing) type, the spectrum of the said signal comprising two master lines having a fixed frequency difference between them, the method being characterised by the computation of the variation of the phases of the two lines as a function of time with the aid of a fast Fourier Transform on reception, the said oscillators being frequency adjustable and the result of the said computation serving to set the frequency of the sampling oscillator and the frequency of at least one of the other two oscillators.

Other characteristics and advantages of the present invention will emerge on reading the description given hereafter of a preferred embodiment of a device implementing the present invention, this description being given with reference to the attached drawings in which:

BRIEF DESCRIPTION OF THE DRAWINGS

To simplify the description, in the figures the same references have been used to designate the same elements.

DESCRIPTION OF THE PREFERRED EMBODIMENTS

Figure 1:
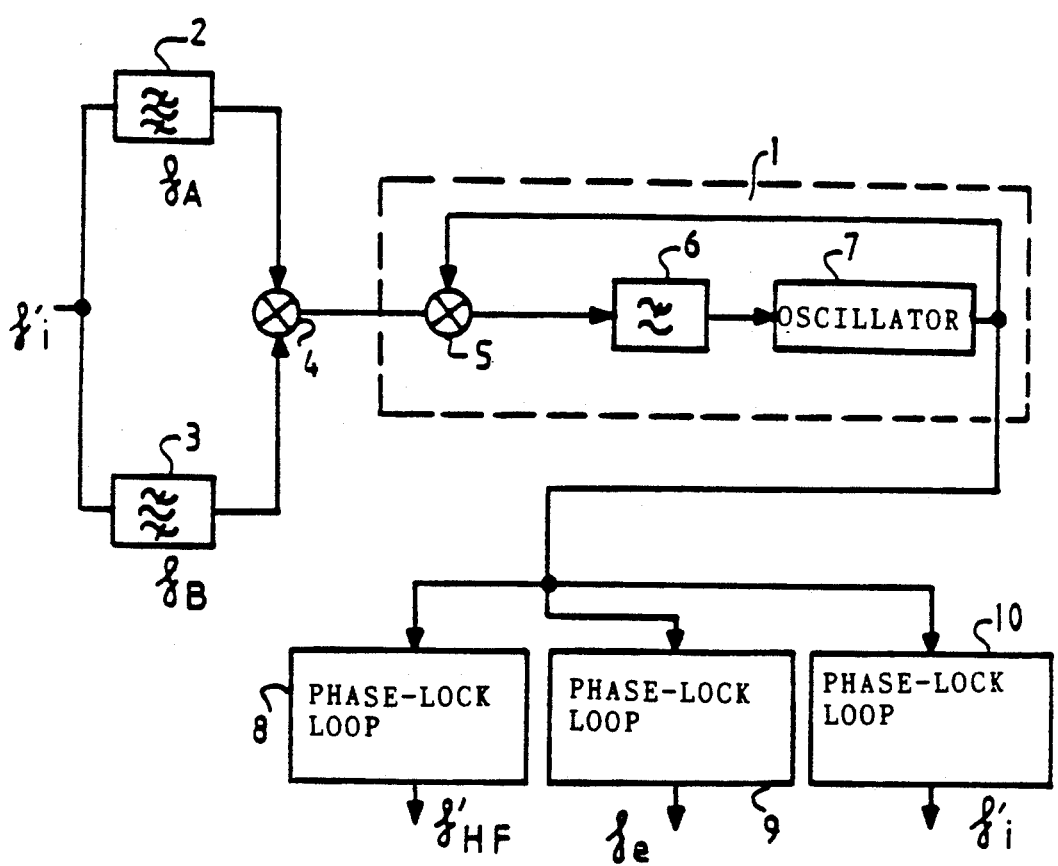
FIG. 1 already described is a block diagram of an embodiment of a feedback control device making it possible to realign the local oscillators of a receiver according to the prior art.
Figure 2:
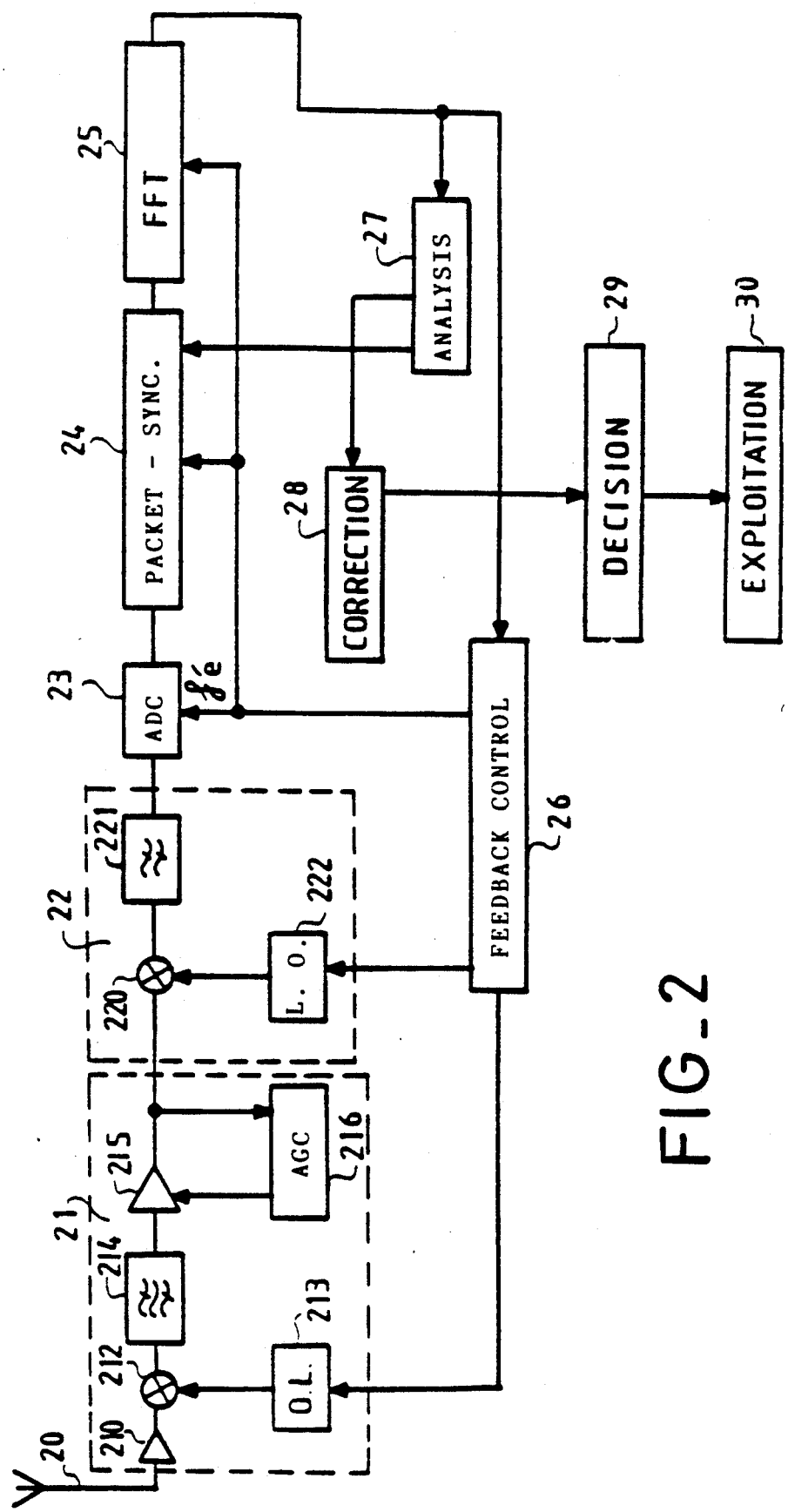
FIG. 2 is a block diagram of an embodiment of a receiver in which the present invention can be implemented.

The method of realigning the local oscillators according to the present invention can be implemented in a receiver such as represented in FIG. 2. This receiver therefore comprises, in manner known per se, a reception antenna 20, a receiver circuit 21 principally transforming the reception frequency into an intermediate frequency, a translation circuit 22 transforming the intermediate frequency into a baseband frequency, an analog digital converter 23, a packet synchronising circuit 24, a demodulating circuit 25 consisting of a fast Fourier transform circuit, a feedback control circuit 26, an analysis circuit 27, a correction circuit 28, a decision circuit 29 and an exploitation circuit 30. These various circuits as well as their operation have been described in the International Patent Application PCT/FR 89/00546. More specifically, the receiver 21 comprises an amplifier 210 amplifying the signal arising from the antenna 20. The output of the amplifier 210 is connected up to the first input of a mixer 214 whose other input receives a frequency arising from a local oscillator 213. The output of the mixer 212 is connected up to the input of a band-pass filter 214. The output of the band-pass filter 214 is connected up to the input of an amplifier 215 which comprises a loop for negative-feedback with an automatic gain-control circuit 216. In this circuit, the amplifier 210 amplifies the signal picked up by the antenna 20. By beating with a high-frequency signal delivered by the local oscillator 213, the mixer 212 lowers the frequency of the signal received. The signal at the output of the mixer is filtered by the filter 214, which makes it possible to eliminate the signals which are foreign to the signals which it is wished to be able to receive. the amplifier 215 under control of the automatic gain circuit 216 carries out the amplification of the intermediate frequency signal $f'_i$ obtained at the output of the circuit 21. This intermediate frequency signal is therefore sent to an intermediate frequency to baseband translation circuit 22 comprising, as represented in FIG. 2, a mixer 220 which receives the amplified intermediate frequency on one input and the frequency arising from a local oscillator 222 on the other input. The output from the mixer is sent to a low-pass filter 221. In this case, the mixer 220 performs beatings between the signal delivered by the oscillator 222 and the signals with the intermediate frequency $f'_i$ and supplies a baseband signal. The filter 221 selects the desired part of the spectrum so as to obtain a baseband signal sent to the analog digital converter 23. The converter therefore performs a digital sampling of the signal at the sampling frequency $f_e$ synchronised by the feedback control device 26. The packet-synchronisation circuit 24 makes it possible among other things to determine the start of a transmission interval, which enables the carriers to be reorthogonalised. This type of operation allows a rough packet synchronisation (to within a few samples). A finer synchronisation is carried out by the analysis circuit 27 by examining the rotation of the phase throughout the band. The packet-synchronising circuit comprises, for example, means of subtracting the signal with a signal delayed by a duration T. As long as the two samples are handled in the same transmission interval of duration T+ΔT, their difference is nearly constant. This is true for each transmission interval over a duration ΔT decreased by the time of arrival of the most distant multiple echo. By contrast, rapid fluctuation of this difference indicates that the two samples no longer belong to the same transmission interval. Thus, from the difference of the two samples, the instant of change of transmission interval is determined and thereby a synchronisation of the intervals of transmission called packet-synchronisation. This device for packet-synchronisation operates at the sampling frequency $f_e$. Furthermore, in the embodiment represented, the demodulating circuit 25 consists of a circuit for fast Fourier transform computation. The receiver described above is adapted to receive signals modulated in a transmitter comprising at least one circuit for inverse fast Fourier transform computation. The modulation is a multicarrier modulation of OFDM (Orthogonal Frequency Division Multiplexing) type with addition of a transition interval Δt at the start of each transmission interval t, the spectrum of the said signal comprising two master lines K1 and K2 having a fixed frequency difference between them.

The mathematical elements enabling the method of the present invention to be implemented will be given hereafter. These mathematical elements are given by starting from the following assumptions. For the transmitter:

the number of channels is 512;

the signal is composed, in this case, of 2048 points, for a transmission sampling frequency twice the Shannon frequency;

the transition interval then corresponds to 256 samples.

In this case, the signal transmitted by the transmitter is given by the equation below:

$$S(t) = \sum_{j=-\infty}^{+\infty} \sum_{k=0}^{511} \rho_{j,k} \cos\left[2\pi(k+D)\frac{f_e}{N}(t-j\Delta) + \phi_{j,k} - k\frac{\pi}{4}\right] \times \pi(t - j\Delta)$$

where $\Delta = q \times 2T_e$ $\pi(t)=1$ $0 \leq t \leq \Delta$ (with q=1152, i.e. 1024+128 in the present case) $T_e = 1/f_e$ $\pi(t)=0$ elsewhere N=2048 D: offset of the carriers in the transmitted spectrum, $\rho_{j,k}\phi_{j,k}$ is the item of information transported by the $k^{th}$ carrier during the time interval [jΔ, (j+1)Δ] in which $f_e$ corresponds to the sampling frequency and Δ to the interval of transmission consisting of the useful part plus the transition interval.

In a manner known per se, the signal S(t) undergoes, on transmission and on reception, a certain number of translations, namely, on transmission, a baseband to intermediate frequency $f_i$ translation and an intermediate frequency/high frequency translation giving the frequency $f_{HF}$ and, on reception, a high frequency $f'_{HF}$ to intermediate frequency $f'_i$ translation and an intermediate frequency $f'_i$ to baseband translation. After translation, namely at the input of the analog digital converter 23, we receive the signal represented by the equation:

$$S(t) = \sum_{j=-\infty}^{+\infty} \sum_{k=0}^{511} \rho_{j,k} \cos\left[2\pi\left[(k+D)\frac{f_e}{N} + \Delta f_i + \Delta f_{HF}\right]t - 2\pi(k+D)\frac{f_e}{N} \times j\Delta + \phi_{j,k} - k\frac{\pi}{4}\right]\pi(t - j\Delta)$$

with
$f_i$: intermediate frequency of transmission
$f'_i$: intermediate frequency of reception
$f^R_i$: intermediate frequency of theoretical reception, $$f^R_i = f_i - D\frac{f_e}{N}$$

$f_{HF}$: HF frequency of transmission
$f'_{HF}$: HF frequency of reception.
We put:

$$f'_i = f_i^R(1 + \delta_2) = \left(f_i - D\frac{f_e}{N}\right)(1 + \delta_2)$$

$$\Delta f_i = f'_i - f_i = \delta_2 f_i^R - D\frac{f_e}{N}$$

$$f'_{HF} = f_{HF}(1 + \delta_3)$$

$$\Delta f_{HF} = f'_{HF} - f_{HF} = \delta_3 f_{HF}$$

and it follows that $$S'(t) = \sum_{j=-\infty}^{+\infty} \sum_{k=0}^{511} \rho_{j,k} \cos\left[2\pi\left[(k + N\left(\frac{\delta_2 f_i^R + \delta_3 f_{HF}}{f_e}\right)\right]f_e t - 2\pi k\frac{f_e}{N} j\Delta + \phi_{j,k} - k\frac{\pi}{4}\right]\pi(t - j\Delta)$$

We sample at the frequency $$f'_e = \frac{f_e}{2}(1 + \delta_1)$$

(in the above equations $\delta_1$, $\delta_2$, $\delta_3$ represent the frequency offsets for which it is sought to compensate).

At the output of the analog digital converter 23, we obtain the signal represented by the formula:

$$S'(n) = S'(t = nT_e + \delta_e) =$$

$$\sum_{j=-\infty}^{+\infty} \sum_{k=0}^{511} \rho_{j,k} \cos\left[\frac{2\pi}{N}\left[k + N\left(\frac{\delta_2 f_i^R + \delta_3 f_{HF}}{f_e}\right)\right]f_e(nT_e) + \delta_e\right) - 2\pi k\frac{f_e}{N} j\Delta + \phi_{j,k} - k\frac{\pi}{4}\right]\pi(nT_e + \delta_e - j\Delta)$$

we take the standpoint of a sample n corresponding to a start of transmitted packet, for example the $j^{th}$. We must have $$\begin{cases} (n-1)T_e < j\Delta - \delta_e \\ nT_e \geq j_0 - \delta_e \end{cases}$$

In this case, we recover the information transmitted in respect to block No. j and by numbering the samples from 0 to 1151 starting from n we obtain:

$$s'(n + i)_{i=0,\ldots 1151} =$$

$$\sum_{k=0}^{511} \rho_{j,k} \cos\left[\frac{2\pi}{N}\left[k + N\left(\frac{\delta_2 f_i^R + \delta_3 f_{HF}}{f_e}\right)\right](n + i)f_e T_e -$$

-continued $$2\pi k\frac{f_e}{N} j\Delta + \phi_{j,k} - K\frac{\pi}{4} +$$

$$\frac{2\pi}{N}\left[k + N\left(\frac{\delta_2 f_i^R + \delta_3 f_{HF}}{f_e}\right)\right]f_e \delta_e$$

We have:

$$T_e = \frac{1}{f'_e} = \frac{2T_e}{1 + \delta_1},$$

and we put $$N' = 1024 = \frac{N}{2}$$

Then $$s'(n + i)_{i=0,1151} =$$

$$\sum_{k=0}^{511} \rho_{j,k} \cos\left[\frac{2\pi}{N'}\left[k + N\left(\frac{\delta_2 f_i^R + \delta_3 f_{HF}}{f_e}\right)\right]\frac{(n+i)}{(1+\delta_1)} -$$

$$2\pi k\frac{f_e}{N} \times 1152 \times 2 \times T_e \times j + \phi_{j,k} - k\frac{\pi}{4} +$$

$$2\pi\left[K\frac{f_e}{N} + (\delta_2 f_i^R + \delta_3 f_{HF})\right]\delta_e =$$

$$\sum_{k=0}^{511} \rho_{j,k} \cos\left[\frac{2\pi}{N'}\left[k + N\left(\frac{\delta_2 f_i^R + \delta_3 f_{HF}}{f_e}\right)\right]i/1 + \delta_1 +$$

$$\frac{2\pi}{N'}\left[k + N\left(\frac{\delta_2 f_i^R + \delta_3 f_{HF}}{f_e}\right)\right]n/1 + \delta_1 - \frac{2\pi}{N'} k \times$$

$$1152 \times j + \phi_{j,k} - k\frac{\pi}{4} + 2\pi\left[k\frac{f_e}{N} + (\delta_2 f_i^R + \delta_3 f_{HF})\right]\delta_e\right]$$

We put:

$$K' = \left(k + \frac{N}{f_e}(\delta_2 f_i^R + \delta_3 f_{HF})\right)\frac{1}{1 + \delta_1}$$

Then:

$$s'(n+1) \atop i=0,\ldots 1151 =$$

$$\sum_{0}^{511} \rho_{j,k} \cos\left[\frac{2\pi}{N'} k' \cdot i + \frac{2\pi}{N'} [k' \cdot n - k \cdot 1152j] + \phi_{j,k} - k\frac{\pi}{4} + 2\pi \frac{f_e}{N} (1+\delta_1)k'\delta_e\right]$$

We shift by 128 samples, i.e.:

$$s'(n+i+128) \atop i=0,\ldots 1023 =$$

$$\sum_{0}^{511} \phi_{j,k} \cos\left[\frac{2\pi}{N'} k' \cdot i + \frac{2\pi}{N'} [k' \cdot n - k \cdot 1152j] + \phi_{j,k} + \frac{\pi}{4} [k' - k] + 2\pi \frac{f_e}{N} (1+\delta_1)k'\delta_e\right]$$

The demodulation by the circuit for fast Fourier transform computation gives:

$$\rho'_{j,k} \simeq \rho_{j,k}$$

$$\phi'_{j,k} \simeq \phi_{j,k} + \frac{2\pi}{N'} [K'n - K1152j] + \frac{\pi}{4} [K' - K] + 2\pi \frac{f_e}{N} (1+\delta_1)K'\delta_e$$

$\rho$ representing the amplitude and $\phi$ the phase of the samples. The sign "$\simeq$" arises from the fact that $K' \simeq K$ and that the FFT reception circuit is offset.

If we examine the signal 1 packets later, i.e. the samples $(n+1\times 1152+i+128,\ i=0,\ldots 1023)$, then $n \to n+1 \times 1152$ and $j \to j+1$ (we decode the information from the $(j+1)^{th}$ packet).

The FFT circuit 25 gives:

$$\rho'_{j+1,k} \simeq \rho_{j+1,k} \ et \phi'_{j+1} \simeq \phi_{j+1,k} + \frac{2\pi}{N'} [K'(n+1+152) - K 1152(j+1)] + \frac{\pi}{4} [K' - K] + 2\pi \frac{f_e}{N} (1+\delta_1)K'\delta_e$$

If we compute $\phi'_{j+1,k} - \phi'_{j,k}$, we obtain:

$$\Delta \simeq \phi_{j+1,k} - \phi_{j,k} + \frac{2\pi}{N'} [K' - K] \times 1152 \cdot 1 \frac{2\pi}{N'} [K' - K] \times 1152 \cdot 1$$

therefore represents the phase rotation due to the poor aligning of the local oscillators.

Nevertheless, in the transmission signal, there are two carriers or master lines, $k_1$ and $k_2$, such that $\phi_{j,k1}$ and $\phi_{j,k2}$ are constant whatever the packet j. Moreover, these lines having continuous phase, that is to say free of phase jump. The analysis can be done anywhere within the signal received, this being conveyed by the relationships:

$$k1 + D = n1 \times 32\ n,\ and\ n1 \in N$$

$$k2 + D = n2 \times 32$$

In this case, the difference between the phases computed by the FFT circuit for these two lines and for received data separated by $1152 \times 1$ samples is given, on putting $k_{1,2} = k_1$ or $k_2$, by:

$$R(\delta_1, \delta_2, \delta_3, 1, k_{1,2}) = \frac{2\pi}{N'} [K'_{1,2} - K_{1,2}] \times 1152\ 1 =$$

$$\frac{2\pi}{N'} \left[\frac{K_{1,2} + N/f_e (\delta_2 f_i^R + \delta_3)}{(1+\delta_1)} - K_{1,2}\right] \times 1152 \times 1$$

Expanding, we obtain:

$$R(\delta_1, \delta_2, \delta_3, 1, k_{1,2}) = -\frac{2\pi}{N'} \frac{\delta_1}{1+\delta_1} \times K_{1,2} \times 1152\ 1 +$$

$$2\pi \times 1152\ 1 \times \frac{2}{1+\delta_1} \left[\frac{\delta_2 f_i^R}{f_e} + \frac{\delta_3}{f_e}\right]$$

If we compute:

$$R(\delta_1, \delta_2, \delta_3, 1, k_1) - R(\delta_1, \delta_2, \delta_3, 1, k_2) = \Delta(\delta_1, 1)$$

We obtain:

$$\Delta(\delta_1, 1) = -\frac{2\pi}{N'} \frac{\delta_1}{(1+\delta_1)} (k_1 - k_2) \times 1152 \times 1 \simeq$$

$$-\frac{2\pi}{N'} \delta_1(k_1 - k_2) \times 1152 \times 1,$$

hence proportional to $\delta_1$

If for example $k_1 > k_2$, then:

$$\Delta(\delta_1, 1) < 0 \to \delta_1 > 0\ we\ decrease\ f'_e$$

$$\Delta(\delta_1, 1) > 0 \to \delta_1 < 0\ we\ increase\ f'_e$$

$$\Delta(\delta_1, 1) = 0 \to \delta_1 = 0\ f'_e\ properly\ aligned.$$

If we compute:

$$R(\delta_1, \delta_2, \delta_3, 1, k_1) + R(\delta_1, \delta_2, \delta_3, 1, k_2) - \frac{k_1 + k_2}{k_1 - k_2} \Delta(\delta_1, 1) = \Delta(\delta_1, 1) \frac{k_1 + k_2}{k_1 - k_2}$$

being a known constant which depends only on the indices $k_1$ and $k_2$ of the carriers used as master lines. This known number will therefore be coded over n bits (n depending on the accuracy desired) for installation in a D.S.P. (Digital Signal Processor).

We obtain $$\Delta(\delta_2, \delta_3, 1) = 4 \times 2\pi \left[\delta_2 \frac{f_i^R}{f_e} + \delta_3 \frac{f_{HF}}{f_e}\right] \times \frac{1}{1+\delta_1} \times$$

$$1152 \times 1 \simeq 8\pi \left[\delta_2 \frac{f_i^R}{f_e} + \delta_3 \frac{f_{HF}}{f_e}\right] \times 1152 \times 1$$

if $$\Delta(\delta_2, \delta_3, 1) < 0 \to \delta_2 < -\delta_3 \frac{f_{HF}}{f_i^R}\ we\ increase\ f_i$$

$$\Delta(\delta_2, \delta_3, 1) > 0 \to \delta_2 < -\delta_3 \frac{f_{HF}}{f_i^R}\ we\ decrease\ f$$

-continued $$\Delta(\delta_2, \delta_3, 1) = 0 \rightarrow \delta_2 = -\delta_3 \frac{f_{HF}}{f_i^R} f_i \text{ properly aligned.}$$

Figure 3:
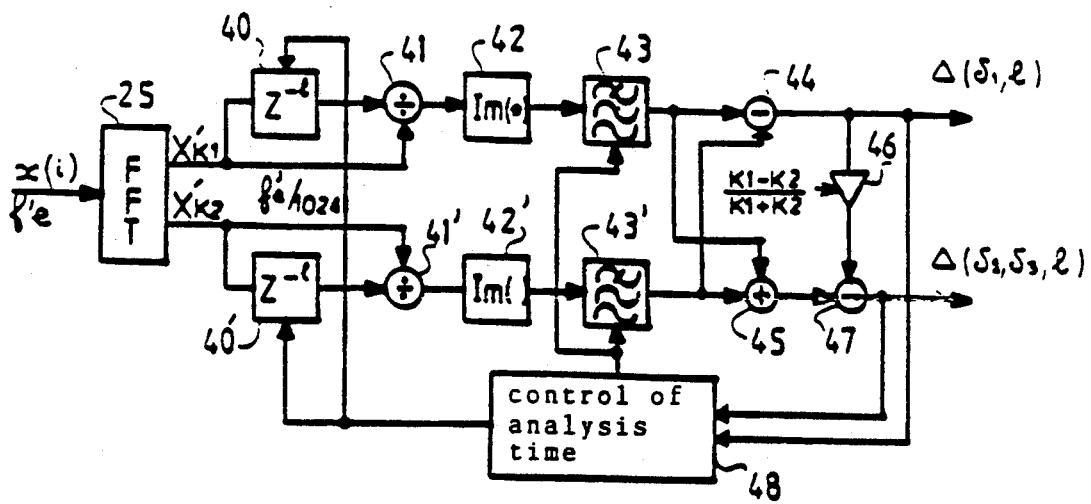
FIG. 3 is a diagram explaining the implementation of the method of the present invention.

We therefore see that by determining $\Delta(\delta_1, 1)$ and $\Delta(\delta_2, \delta_3, 1)$, we can obtain values making it possible to alter the frequency of the sampling oscillator and the frequency of the intermediate frequency/baseband translation oscillator.

$$\Delta(\delta_1, 1) = [\phi'_{j+1,k1} - \phi'_{j,k1}] - [\phi'_{j+1,k2} - \phi'_{j,k2}]$$

$$\Delta(\delta_2, \delta_3, 1) = [\phi'_{j+1,k1} - \phi'_{j,k2}] +$$

$$[\phi'_{j+1,k2} - \phi'_{j,k1}] - \frac{k_1 + k_2}{k_1 - k_2} \Delta(\delta_1)$$

where for example $\phi'_{j,k1,2}$ is the phase term given by the FFT reception circuit 25 for the carrier $k_1$ or $k_2$ and for an arbitrary input sample block numbered j and where $\phi'_{j+1,k1,k2}$ is then given for an input sample block separate from the block No. j for $1152 \times 1$ samples;

$\Delta(\delta_1, 1)$ and $\Delta(\delta_2, \delta_3, 1)$ can be obtained by carrying out the functions represented in FIG. 3. In this FIG. 3, the FFT circuit 25 makes it possible to obtain at output the value $x'_{k1}$ and $x'_{k2}$ corresponding to the carriers $K_1$ and $K_2$ respectively. Actually, the FFT circuit does not give the amplitude and phase of the carriers directly but the values:

$$x'_{j,k1} = \rho'_{j,k1} e^{j\phi'_{j,k1}}$$

$$x'_{j,k2} = \rho'_{j,k2} e^{j\phi'_{j,k2}}$$

As represented in FIG. 3, the output $x'_{k1}$ from the FFT circuit 25 is sent respectively as input to a means 40 for producing a delay of 1 samples and to the input of a divider 41 which receives, on its other input, the output from the means 40. The output from the divider 41 is sent to a circuit 42 handling the imaginary part of the signal arising from the divider 41. Indeed, if we regard the amplitude of the carriers as constant between two measurements, then:

$$\frac{x'_{j+1,k1}}{x'_{j,k1}} = e^{+j(\phi_{j+1,k1} - \phi_{j,k2})}$$

$$\frac{x'_{j+1,k2}}{x'_{j,k2}} = e^{j(\phi_{j+1,k2} - \phi_{j,k2})}$$

Figure 4:
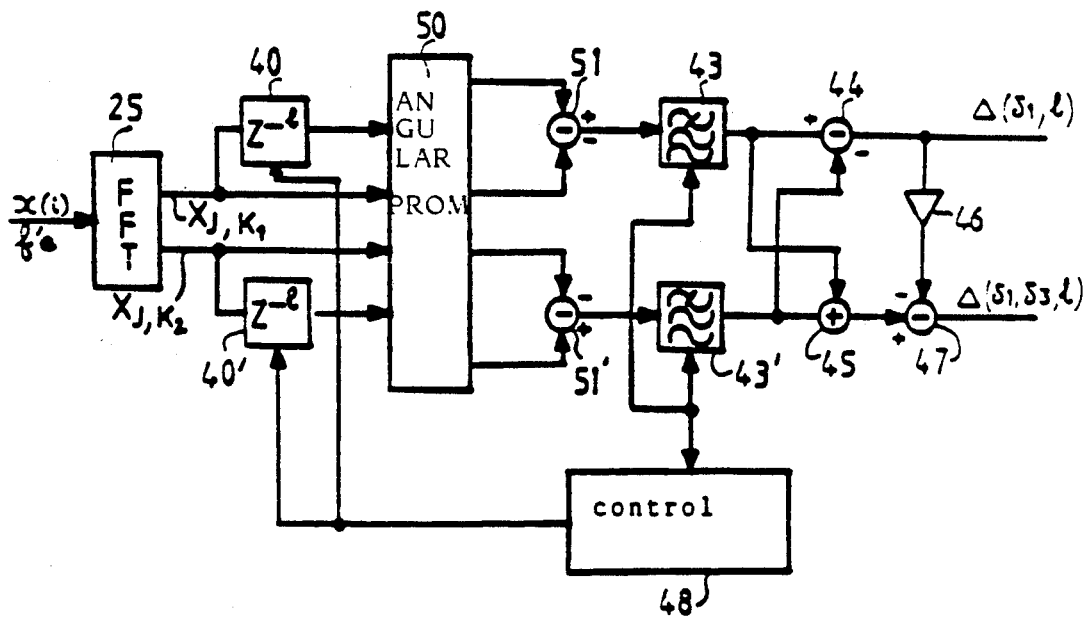
FIG. 4 is another diagram explaining the implementation of the method of the present invention.

If the difference of the phases is small ($\rightarrow$weak offset of the local oscillators) then we can write:

$$\phi'_{j+1,k1} - \phi'_{j,k1} \simeq Im\left[\frac{x'_{j+1,k1}}{x'_{j,k1}}\right]$$

and $$\phi'_{j+1,k2} - \phi'_{j,k2} \simeq Im\left[\frac{x'_{j+1,k2}}{x'_{j,k2}}\right]$$

or else we use a PROM memory giving the tabulation of the function as represented in FIG. 4 explained below.

The output from the circuit 42 is sent to a low-pass 43. This is in fact a circuit which carries out an averaging over several elements, that is to say which carries out a filtering of the information in order to eliminate the noise which is regarded as having zero mean. The output from the circuit 43 is sent to a subtractor 44. Similarly, the signal $x'_{k2}$ arising from the FFT circuit 25 is sent to a means 40' producing a digital delay of, for example, 1 packets of 1152 samples. The signal $X'_{K2}$ is also sent to an input of a divider 41' which receives, on its other input, the signal arising from the circuit 40' so as to carry out the division:

$$\frac{x'_{j+1,k2}}{x'_{j,k2}}$$

as mentioned in the above formula. The output from the divider 41' is sent to a circuit 42' extracting the imaginary part. The output from the circuit 42' is sent to a low-pass filter 43' identical to the filter 43. The output from the filter 431 is sent respectively as input to an adder 45 which receives on its other input the output from the filter 43 and to the second input of the subtractor 44 which outputs the value $\Delta(\delta_1, 1)$. Furthermore, the output from the subtractor 44 is sent to a circuit 46 so as to multiply the output element by a coefficient $$\frac{k_1 - k_2}{k_1 + k_2}$$

which is known and quantised over a number of bits sufficient to ensure good accuracy.

The output from the circuit 46 is sent to one of the inputs of a subtractor 47 which receives on its other input the output from the adder 45. The output from the subtractor gives the value $\Delta(\delta_2, \delta_3, 1)$. Furthermore, the two values $\Delta(\delta_1, 1)$ and $\Delta(\delta_2, \delta_3, 1)$ are used to carry out the realignment of the frequency of the local oscillator 222 and a local sampling oscillator (not shown) for sampling the ADC converter 23. Moreover, the two values $\Delta(\delta_1, 1)$ and $\Delta(\delta_2, \delta_3, 1)$ are also input to a circuit 48 for control of the analysis time. The outputs from the analysis time control circuit are sent to the circuits 40 and 40' in order to modify the value of 1, that is to say the value of the digital delay measured as number of packets of 1152 samples and to the circuits 43 and 43'. Actually, when approaching ideal values for the local oscillators, the terms $\Delta(\delta_1, 1)$ and $\Delta(\delta_2, \delta_3, 1)$ tend to become smaller and smaller, except if at the same time we increase the value of 1, that is to say the analysis time to permit the phases to rotate. This is the objective of the circuit for control of the analysis time.

In FIG. 4 has been represented another way of obtaining the terms $\Delta(\delta_1, 1)$ and $\Delta(\delta_2, \delta_3, 1)$. This manner can be used without making any approximation regarding the phase difference. In FIG. 4, the same elements as those of FIG. 3 carry the same references and will not be redescribed in detail. In this figure, the dividers 41 and 41' and the circuits 42 and 42' handling the imaginary part have been replaced by a PROM memory 50 carrying out a cartesian-polar transformation making it possible to obtain $\rho'_{j,k1}$, $\rho'_{j,k2}$, and $\phi'_{j,k1}$, $\phi'_{j,k2}$, and by two subtractors 51 and 51'.

It is clear to the expert that FIGS. 3 and 4 are given merely by way of example.

We claim:

1. Method of realigning the oscillators of a receiver comprising a high frequency/intermediate frequency translation oscillator, an intermediate frequency/baseband translation oscillator, and a sampling oscillator receiving a signal modulated according to multicarrier modulation of OFDM (Orthogonal Frequency Division Multiplexing) type using inverse fast Fourier transform $FFT^{-1}$ computation the spectrum of the said signal comprising two master spectral lines having a fixed frequency difference between them, the method comprising computation of the variation of the phase of the two spectral lines as a function of time with the aid of fast Fourier transform on reception, then said oscillators being frequency adjustable and setting the frequency of the sampling oscillator and the frequency of at least one of the other two oscillators according to the result of said computations.

2. Method according to claim 1, characterised in that the modification of the frequency of the intermediate frequency/baseband translation oscillator is carried out by computing:

$$\Delta(\delta_2, \delta_3, 1) = [\phi'_{j+1,k1} - \phi'_{j,k1}] + [\phi'_{j+1,k2} - \phi'_{j,k2}] - \frac{k_1 + k_2}{k_1 - k_2} \Delta(\delta_1, 1)$$

in which $\phi'_{j,k1}$ and $\phi'_{j,k2}$ are respectively the phase given by the fast Fourier transform computation on reception for the carriers $k_1$ and $k_2$ for an input sample block j and $\phi'_{j+1,k1}$ and $\phi'_{j+1,k2}$ being the phase for a block separated from the block j by $q \times 1$ samples, and $$\Delta(\delta_1, 1) = [\phi'_{j+1,k1} - \phi'_{j,k1}] - [\phi'_{j+1, k2} - \phi'_{j,k2}]$$

and by modifying the frequency as a function of the value of $\Delta(\delta_2, \delta_3, 1)$, where $\Delta(\delta_2, \delta_3, 1)$ is a phase difference corresponding to the frequency offset $\delta_2, \delta_3$ seen 1 packets later, the oscillator being correctly adjusted when:

$$\Delta(\delta_2, \delta_3, 1) = 0.$$

3. Method according to claim 1, characterised in that the modification of the frequency of the oscillator giving the sampling frequency is carried out by computing:

$$\Delta(\delta_1, 1) = [\phi'_{j+1,k1} - \phi'_{j,k1}] - [\phi'_{j+1, k2} - \phi'_{j,k2}]$$

and by modifying the frequency as a function of the value of $\Delta(\delta_{1,1})$, the oscillator being correctly adjusted when $\Delta(\delta_{1,1}) = 0$.

4. Device for implementing the method according to any one of claims 1 to 3, characterised in that it comprises an FFT circuit (25) providing at its output:
means (40, 40') for delaying by $q \times 1$ samples the values $X'_{k1}$, and $X'_{k2}$ arising from the FFT circuit (25) and corresponding to the master lines $k_1$ and $k_2$,
two dividers (41, 41') carrying out respectively the division $$\frac{X_{j+1,k1}}{X_{j,k1}} \text{ and } \frac{X_{j+1,k2}}{X_{j,k2}}$$

two means (42, 42') for the imaginary part of the values arising from each divider,
a subtractor (44) subtracting the value arising from one of the means handling the imaginary part from the value arising from the other means handling the imaginary part so as to obtain $\Delta(\delta_1,1)$,
an adder (45) adding the values arising from the two means (42, 42') for the imaginary part,
a multiplier multiplying the value $\Delta(\delta, _11)$ by a coefficient $$\frac{k_1 - k_2}{k_1 + k_2}$$

a subtractor (47) subtracting the value arising from the multiplier from the value arising from the adder so as to obtain $\Delta(\delta_2, \delta_3, 1)$.

5. Device according to claim 4, characterised in that it includes at the output of each means for the imaginary part, an averaging device (43, 43').

6. Device according to claim 4, characterized in that it additionally includes an analysis time control circuit (48) allowing modification of the analysis time, namely the value of 1.

7. Device according to claim 5, characterised in that the dividers and the means for the imaginary part of the values arising from each divider comprise an angular PROM memory performing the cartesian-polar transformation and by two subtractors.

8. Device according to claim 5, characterized in that it additionally includes an analysis time control circuit (48) allowing modification of the analysis time, namely the value of 1.

* * * * *